US011122128B2

(12) United States Patent
Yan

(10) Patent No.: US 11,122,128 B2
(45) Date of Patent: Sep. 14, 2021

(54) METHOD AND DEVICE FOR CUSTOMER RESOURCE ACQUISITION, TERMINAL DEVICE AND STORAGE MEDIUM

(71) Applicant: Ping An Technology (Shenzhen) Co., Ltd., Guangdong (CN)

(72) Inventor: Baohang Yan, Guangdong (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 464 days.

(21) Appl. No.: 16/095,803

(22) PCT Filed: Jan. 23, 2018

(86) PCT No.: PCT/CN2018/073789
§ 371 (c)(1),
(2) Date: Oct. 23, 2018

(87) PCT Pub. No.: WO2019/041738
PCT Pub. Date: Mar. 7, 2019

(65) Prior Publication Data
US 2021/0126980 A1   Apr. 29, 2021

(30) Foreign Application Priority Data
Aug. 28, 2017   (CN) .......................... 201710747850.1

(51) Int. Cl.
G06F 15/16   (2006.01)
H04L 29/08   (2006.01)
G06F 40/174   (2020.01)

(52) U.S. Cl.
CPC .......... *H04L 67/146* (2013.01); *G06F 40/174* (2020.01); *H04L 67/145* (2013.01); *H04L 67/306* (2013.01)

(58) Field of Classification Search
CPC ... G06F 40/174; H04L 67/145; H04L 67/146; H04L 67/306
(Continued)

(56) References Cited

U.S. PATENT DOCUMENTS 6,237,023 B1 * 5/2001 Yoshimoto ............ H04L 63/102
709/203
8,495,223 B2 * 7/2013 Osamura ................. H04L 41/00
709/227

(Continued)

FOREIGN PATENT DOCUMENTS

| CN | 106156959 A | 11/2016 |
| CN | 106886570 A | 6/2017 |
| CN | 106941509 A | 7/2017 |

*Primary Examiner* — Bharat Barot

(57) ABSTRACT

The present application discloses a method and a device for customer resource acquisition, a terminal device and a storage medium. The method for customer resource acquisition includes: acquiring user's access request which includes a session identifier, user information and a progress identifier; determining whether the progress identifier is a completed identifier; determining whether the user's access request is a first access request corresponding to the session identifier; if the progress identifier is a completed identifier and the user's access request is not a first access request, determining a corresponding administration process based on the session identifier; storing the user information in an address space corresponding to the administration process, generating a first resource data based on all user information in the address space, uploading the first resource data to server, and destroying the administration process. The method for customer resource acquisition is highly efficient with good database performance.

18 Claims, 4 Drawing Sheets

(58) Field of Classification Search
USPC .................................. 709/202–203, 227–228
See application file for complete search history.

(56) References Cited

U.S. PATENT DOCUMENTS

| | | | | |
|---|---|---|---|---|
| 8,932,132 B2* | 1/2015 | Sakai | ...................... | A63F 13/73 |
| | | | | 709/219 |
| 9,946,896 B2* | 4/2018 | Watanabe | ............. | H04L 67/306 |
| 10,021,098 B2* | 7/2018 | Cai | ...................... | H04L 67/146 |
| 2012/0071186 A1* | 3/2012 | He | ........................ | H04W 52/50 |
| | | | | 455/509 |
| 2014/0344632 A1 | 11/2014 | Ge | | |
| 2018/0276651 A1* | 9/2018 | Gauli | ................ | G06Q 20/3274 |

* cited by examiner

METHOD AND DEVICE FOR CUSTOMER RESOURCE ACQUISITION, TERMINAL DEVICE AND STORAGE MEDIUM

The present application is based on and claims priority to Chinese Patent Application No. 201710747850.1, filed on Aug. 28, 2017, titled "method and device for customer resource acquisition, terminal device and storage medium".

FIELD OF THE INVENTION

The present application relates to the technical field of information processing, especially to a method and a device for customer resource acquisition, a terminal device and a storage medium.

BACKGROUND OF THE INVENTION

Network customer resource acquisition refers to acquiring customer resource via network channels. The network channels include websites, QQ, WeChat, Weibo, forums, etc. The customer resource is the user information input by any user via corresponding network channel while registration. Any registration information input by a customer via network channel can be acquired by the channel owner. For the current network customer resource acquisition, the customer resources are generally stored in a database by a server of the channel owner, which helps the server acquire corresponding customer resources in need. In the current network customer, the user information input by the customer may be divided into several pages and uploaded separately in pages. Because user information upload by each of the pages accesses the database separately and directly, the database is accessed with high frequency, thus resulting in huge access burden to the database. Therefore, the database needs to be accessed a couple of times while the customer resources are acquired via the network channels, which brings substantial burden for database access.

SUMMARY OF THE INVENTION

Embodiments of the present application provide a method and a device for customer resource acquisition, a terminal device and a storage medium so as to deal with the issues that the database needs to be accessed a couple of times while the customer resources are acquired via the network channels.

On one hand, some embodiments provide a method for customer resource acquisition which includes:

user's access request which includes a session identifier, user information and a progress identifier may be acquired;

whether the progress identifier is a completed identifier may be determined;

whether the user's access request is a first access request corresponding to the session identifier may be determined;

if the progress identifier is a completed identifier and the user's access request is not a first access request, an administration process corresponding to the session identifier may be determined; the user information may be stored in an address space corresponding to the administration process; a first resource data based on all the user information may be generated and stored in the address space; the first resource data may be uploaded to the server; and the administration process may be destroyed.

On the other hand, some embodiments provide a device for customer resource acquisition which includes:

an access request acquiring module configured for acquiring user's access request which includes a session identifier, user information and a progress identifier;

a progress identifier determining module configured for determining whether the progress identifier is a completed identifier;

an access request determining module configured for determining whether the user's access request is a first access request corresponding to the session identifier;

a first processing module configured for determining an administration process corresponding to the session identifier; storing the user information in an address space corresponding to the administration process; generating a first resource data based on all the user information stored in the address space; uploading the first resource data to the server; and destroying the administration process if the progress identifier is the completed identifier and the user's access request is not the first access request;

Thirdly, some embodiments of the present application provide a terminal device including a processor, a storage device and computer-readable instructions stored in the storage device and executable on the processor, wherein the processor executes the computer-readable instructions to perform the following steps:

user's access request which includes a session identifier, user information and a progress identifier may be acquired;

whether the progress identifier is a completed identifier may be determined;

whether the user's access request is a first access request corresponding to the session identifier may be determined;

if the progress identifier is the completed identifier and the user's access request is not the first access request, an administration process corresponding to the session identifier may be determined; the user information may be stored in an address space corresponding to the administration process; a first resource data based on all the user information may be generated and stored in the address space; the first resource data may be uploaded to the server; and the administration process may be destroyed.

Fourthly, some embodiments of the present application provide a computer-readable storage medium comprising computer-readable instructions, wherein the computer-readable instructions are executed by a processor to perform the following steps:

user's access request which includes a session identifier, user information and a progress identifier may be acquired;

whether the progress identifier is a completed identifier may be determined;

whether the user's access request is a first access request corresponding to the session identifier may be determined;

if the progress identifier is a completed identifier and the user's access request is not a first access request, an administration process corresponding to the session identifier may be determined; the user information may be stored in an address space corresponding to the administration process, a first resource data based on all the user information stored in the address space may be generated; the first resource data may be uploaded to the server; and the administration process may be destroyed.

In the method and the device for customer resource acquisition, the terminal device and the storage medium in the embodiments of the present application, if the progress identifier in the user's access request is a completed identifier and the user's access request is not a first access request, the user information is stored in an address space corresponding to the session identifier (session ID); a first resource data based on all the user information stored in the address space is generated; and the first resource data is uploaded to the database, such that the database only receives the first resource data once, and all the user information from multiple user's access requests can be acquired, which effectively reduces the number of database accesses, and thus lessens the database access burden.

BRIEF DESCRIPTION OF THE DRAWINGS

In order to illustrate the technical solutions of the embodiments of the present application more clearly, the drawings described along with the description of the embodiments will be briefly described as follows. It is obvious that the drawings are only some embodiments of the present application. Alternative drawings may also be obtained from those of ordinary skill in the art based on these drawings without creative works.

DETAILED DESCRIPTION OF THE PREFERRED EMBODIMENTS

Technical solutions in the embodiments of the present application will be described clearly and completely hereinafter with reference to accompanying drawings. Obviously, the embodiments described herein are merely parts of but not exclusive embodiments of the present application. All alternative embodiments obtained by those skilled in the art based on the embodiments of the present application without creative works shall fall within protection scopes of the present application.

First Embodiment

Figure 1:
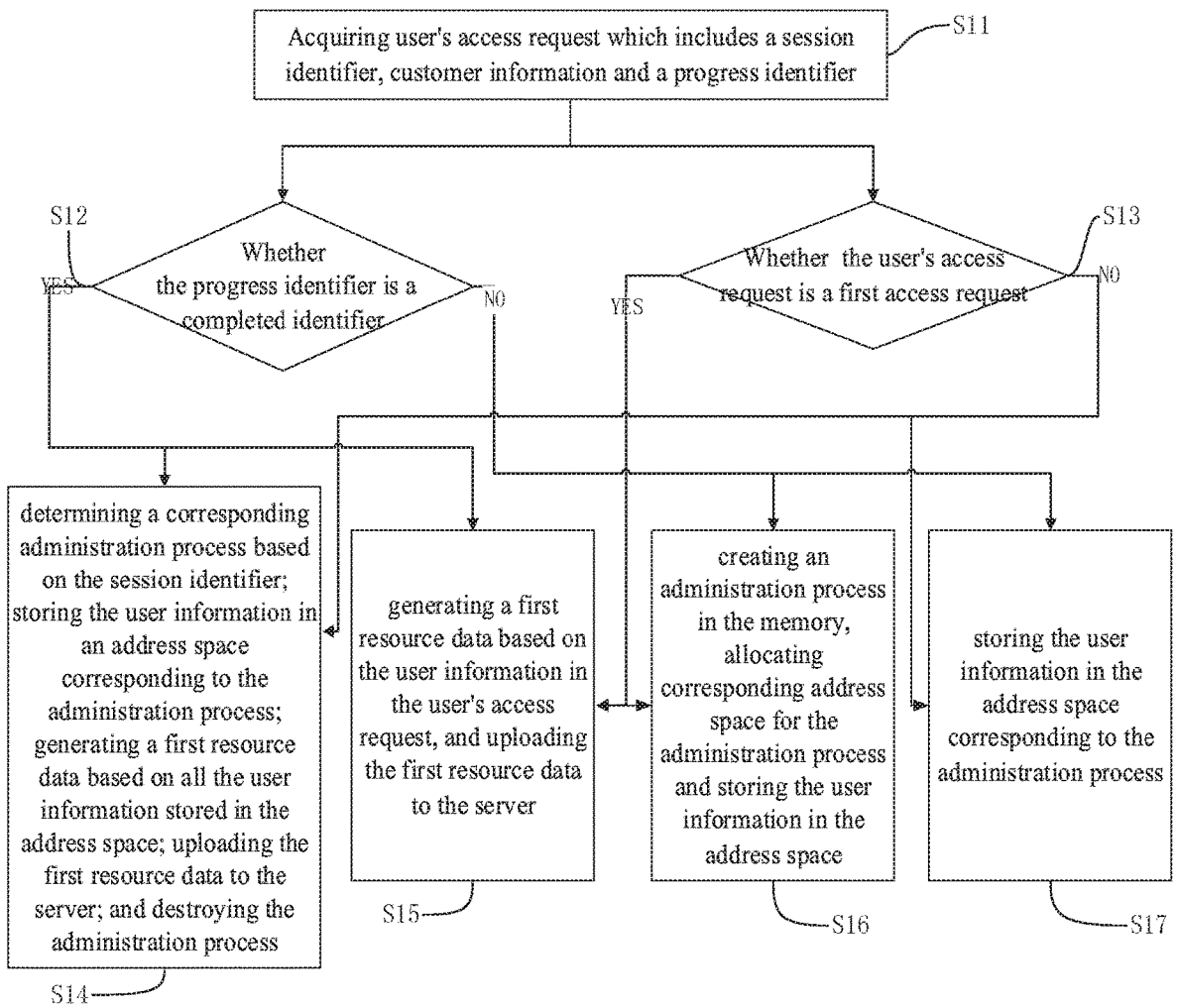
FIG. 1 illustrates a flow chart of a method for customer resource acquisition according to a first embodiment.

FIG. 1 illustrates a flow chart of a method for customer resource acquisition according to the embodiment. The method for customer resource acquisition is applied to acquire customer recourse via network channel, it is also applied to a client, a server connected to the client via network and a database connected to the server so as to collect and acquire customer resource. As shown in FIG. 1, the method for customer resource acquisition includes the following steps.

S11, user's access request which includes a session identifier, user information and a progress identifier may be acquired.

Specifically, the server receives the user's access request sent by the client, where the user's access request includes a session identifier, user information, and a progress identifier. The session identifier (i.e., session ID) is an identifier for uniquely identifying a session. The Session, which is similar to a hash table, refers to a structure for storing information in a server. While the client and the server are in communication with each other via network, a session needs to be established between the client and the server. Specifically, a connecting request is sent to the server from the client, which is then received and responded by the server, and the session is established, so as to achieve communication connection between the client and the server. The user information refers to user-related information input by the user, which includes name, gender, age, ID number, contact number, contact address, etc. Progress information refers to information indicating whether all the user information has been input completely. The progress information includes a completed identifier and an uncompleted identifier, which may be represented as "1" and "0" respectively. It can be understood that each user's access request includes an access request ID which is an identifier for uniquely identifying the user's access request. The access request ID may be an identifier randomly generated according to a predetermined rule when the user's access request is generated.

In the present embodiment, before the client sends the user's access request to the server, the server checks whether the received user's access request includes a session identifier (i.e., session ID). If yes, a session corresponding to the session identifier (i.e., session ID) would be searched out by the server for subsequent use, so as to store the user information in the user's access request; if not, the server would create a session for the client and generate a session identifier (i.e., session ID) associated with the session.

It can be understood that prior to S11, which means before the session is established between the server and the client, i.e., before the client sends any user's access request to the server, the client would send a connecting request to the server, and the server would create a session and a session identifier (session ID) associated with the session, and send responding information back to the client upon receiving the connecting request, such that the session is established between the server and the client. Wherein, the responding information carries the session identifier (session ID).

In the present embodiment, while the client, controlled by the customer, enters a registration interface which requires the customer to input user information, a session is established between the server and the client such that all the user's access requests sent to the server via the registration interface carry the session identifier (session ID) corresponding to the session. The registration interface in the client includes several input pages, each of which provides input boxes for the customer to input user information and a "submit" button. After all the user information is input into the input boxes and the "submit" button is clicked on, the user's access request which includes the session identifier (session ID) and the user information will be input. Furthermore, according the systematic backstage configuration, each of the input pages in the client carries a progress identifier, which includes a completed identifier or ? an uncompleted identifier. Specifically, the last one of the input pages carries a completed identifier, whereas the remaining input page(s) carries an uncompleted identifier. After the user information is input into the input boxes and the "submit" button is clicked on, the user's access request will be sent to the server which acquires the user's access request carrying the session identifier (session ID), the user information and the progress identifier.

S12, Whether the progress identifier is a completed identifier may be determined.

Because the progress identifier can only be a completed identifier or an uncompleted identifier, the process for the server determining whether the progress identifier is a completed identifier is also the process for the server determining whether the progress identifier is an uncompleted identifier. The progress identifier being an uncompleted identifier means that the user information carried in current user's access request received by the server together with the user information in the previously obtained user's access request do not constitute complete user information, and it still needs to continue to obtain other user's access requests to form complete user information. Otherwise (i.e., the progress identifier is a completed identifier), the user information carried in the current user's access request received by the server together with the user information in the previous user's access request constitute complete user information. The complete user information includes all the user information input into all individual input pages in the registration interface.

S13, Whether the user's access request is a first access request corresponding to the session identifier may be determined.

The first access request refers to a first acquired user's access request since the session is established between the server and the client. In the present embodiment, the first access request is a user's access request input after the customer input the user information into the first input page in the registration interface in the client and clicked on the "submit" button. If the user's access request is the first access request, then the user does not sent user's access request to server via the same registration interface of the client before the user requests access. Otherwise, the user has sent user's access request(s) to the server via the same registration interface of the client.

In the present embodiment, while a session is established between the server and the client, a log file is adopted to record access information associated with the session identifier (session ID). While the session is under establishment, the access information recorded by the log file includes a session establishment time, a session identifier (session ID) and a client ID where the session is established. The client ID is an identifier of a client for uniquely identifying a send connection request to create a session (i.e., a Session). After the session is established, each time the server acquires a user's access request, the log file will record the access request ID and the corresponding access time. The access time is the time point when the server receives the user's access request. It can be understood that in S13, the step of determining whether the user's access request is a first access request corresponding to the session identifier includes specifically: inquiring access information in the log file based on the session identifier in the user's access request. If the access information merely includes the session establishment time, the session identifier (session ID) and the client ID where the session is established, then the user's access request is the first access request corresponding to the session identifier. If the access information further includes an access request ID and corresponding access time besides the session establishment time, the session identifier (session ID) and the client ID where the session is established, then the user's access request is not the first access request corresponding to the session identifier.

It can be understood that the step S12 and the step S13 can be executed in a reversed order, which means the step S12 may be executed before or after the step S13.

S14, If the progress identifier is a completed identifier and the user's access request is not a first access request, an administration process corresponding to the session identifier may be determined; the user information may be stored in an address space corresponding to the administration process; a first resource data based on all the user information may be generated and stored in the address space; the first resource data may be uploaded to the server; and the administration process may be destroyed.

The administration process is an execution program created in the memory of the server and configured to manage progress of collecting the user information from the client, which is an independent unit for resource allocation and scheduling in the memory of the server. Each administration process includes an independent address space. The address space is a memory space assigned to the administration space by the memory of the server while the administration process is created, and is configured for storing user information. Furthermore, the server assigns a process ID to the administration process according to a predetermined rule, the progress ID uniquely identifies the administration process. In the present embodiment, the administration process is created while the first access request is received after the session is established between the server and the client; the process ID of the administration process is correlated with the session identifier (session ID).

The first resource data is a complete set of user information formed by all the user information, which means the first resource data is a complete user information corresponding to one user. In the present embodiment, if the progress identifier in the user's access request received by the server is a completed identifier, the current user's access request is the last user's access request which carries the same session identifier (session ID), which means the current access request is the one input while the "submit" button in the last input page in the same registration interface is clicked on by the customer.

In the present embodiment, the progress identifier of the user's access request received by the server being a completed identifier and the user's access request being not the first access request means that an administration process corresponding to the session identifier (session ID) has been established in the memory of the server. The user information in the user's access request is stored in the address space corresponding to the administration process, such that all the user information stored in the address space forms a complete set of user information; a first resource data is generated based on the complete set of user information and then uploaded to the server, such that the server receives a complete set of user information. It can be understood that the server only receives the first resource data once and for all, and the complete set of user information is acquired, instead of receiving user information from multiple user's access requests, which reduces the number of database accesses, and thus lessens database access burden.

S15, If the progress identifier is a completed identifier and the user's access request is a first access request, a first resource data may be generated based on the user information in the user's access request, and the first resource data may be uploaded to the server.

In the present embodiment, the progress identifier in the user's access request being a completed identifier means the customer has input the user information in the last input page in the registration interface of the client, and clicked on the "submit" button so as to input the user's access request. Furthermore, the user's access request being the first access request means that the customer has input the user information in the first input page of the registration interface of the client, and clicked on the "submit" button so as to input the user's access request. In other words, the progress identifier being a completed identifier and the user's access request being the first access request means that there is merely one input page in the registration interface of the client, and only one user's access request is generated. Therefore, the user information in the user's access request is a complete set of user information, which user information may form the first resource data which is then uploaded to the server. The database will only be accessed once to acquire a complete set of user information of any customer, which lessens database access burden to some extent; furthermore, there is no need to create an administration process in the memory of the server when the user information of any user's access request is a complete set of user information, which helps reduce memory occupation.

Specifically, the server can be connected to multiple databases, and the first resource data generated by the server can be uploaded to any one of the databases, such that the "any database" can have the complete set of user information stored therein. In steps S14 and S15, when the first resource data is generated by the server, a database with little data traffic and light network load should be selected based on load-balance algorithm so as to improve uploading efficiency of the first resource data. Load balancing is a norm built on the existing network structure, which is configured for a cheap, effective and transparent method for expanding bandwidth of network device and server, increasing throughput, enhancing network data processing capabilities, and improving network flexibility and availability.

S16, If the progress identifier is not a completed identifier and the user's access request is a first access request, an administration process may be created in the memory, corresponding address space for the administration process may be generated and the user information may be stored in the address space.

In the present embodiment, the progress identifier being not the completed identifier (i.e., an uncompleted identifier) means the user's access request is not the one input after the customer input the user information in the last input page in the registration interface of the client, and clicked on the "submit" button, which means the remaining user's access request(s) needs to be acquired so as to form a complete set of user information. The user's access request acquired by the server being the first access request means that the customer has input the user information in the first input page of the registration interface of the client, and clicked on the "submit" button so as to input the user's access request; the registration interface is correlated with the session identifier (session ID).

Specifically, if the progress identifier is not a completed identifier and the user's access request is a first access request, an administration process should be created in the memory of the server and a process ID of the administration process should be correlated with the session identifier (session ID), such that the administration process corresponding to the process ID may carry all the user's access requests of the same session identifier (session ID) for unified management. Furthermore, while the server creates the administration process in the memory, a corresponding address space is allocated to the administration process, which address space is correlated with the session identifier (session ID), such that the address space may carry the user information in all the user's access requests with the same session identifier (session ID). It can be understood that the user information in the user's access requests is pre-stored in the address space of the administration process so as to prevent each of the user's access request corresponding to each filling page in the registration interface of the client from accessing the database directly, which limits the frequency of database access and lessens database access burden effectively.

S17, If the progress identifier is not a completed identifier and the user's access request is not a first access request, the user information may be stored in the address space corresponding to the administration process.

Specifically, the progress identifier being not the completed identifier (i.e., an uncompleted identifier) and the user's access request being not the first access request means that the current user's access request is not the one input after the customer input the user information in the first or last input page in the registration interface and clicked on the "submit" button, which also means that other user's access request(s) with the same session identifier (session ID) has been acquired before the current user's access request, and there will be further user's access request to be acquired after the current user's access request so as to form a complete set of user information.

In the present embodiment, if the progress identifier is not the completed identifier and the user's access request is not the first access request, a corresponding administration process based on the session identifier (session ID) of the user's access request has been created in the memory of the server. By storing the user information of the user's access request in the address space corresponding to the administration process, the server access burden is lessened and the problem of the superabundant database accesses caused by the user's access requests may be overcome.

In the method for customer resource acquisition in the present embodiment, if the progress identifier of the user's access request is an uncompleted identifier (i.e., not the completed identifier) and the user's access request is the first access request, an administration process is created in the memory, corresponding address space is allocated for the administration process and the user information is stored in the address space, it does not need to directly upload the user's access request to the database, thus lessens database access burden. If the progress identifier of the user's access request is an uncompleted identifier (i.e., not the completed identifier) and the user's access request is not the first access request, the user information is stored in the address space corresponding to the session identifier (i.e., session ID), it does not need to directly upload the user's access request to the database, thus lessens database access burden. If the progress identifier in the user's access request is a completed identifier and the user's access request is not a first access request, the user information is stored in an address space corresponding to the session identifier (session ID); a first resource data based on all the user information stored in the address space is generated; and the first resource data is uploaded to the server, such that the database only receives the first resource data once and for all, and the complete set of user information from multiple user's access requests is acquired, which reduces the number of database accesses, and thus lessens database access burden. If the progress identifier is a completed identifier and the user's access request is a first access request, a first resource data is generated based on the user information in the user's access request, and then uploaded directly to the server, such that the database only receives the first resource data once and for all, and the complete set of user information from multiple user's access requests is acquired, which reduces memory occupation of the administration process, thus shortens response time of the server to the client.

Figure 2:
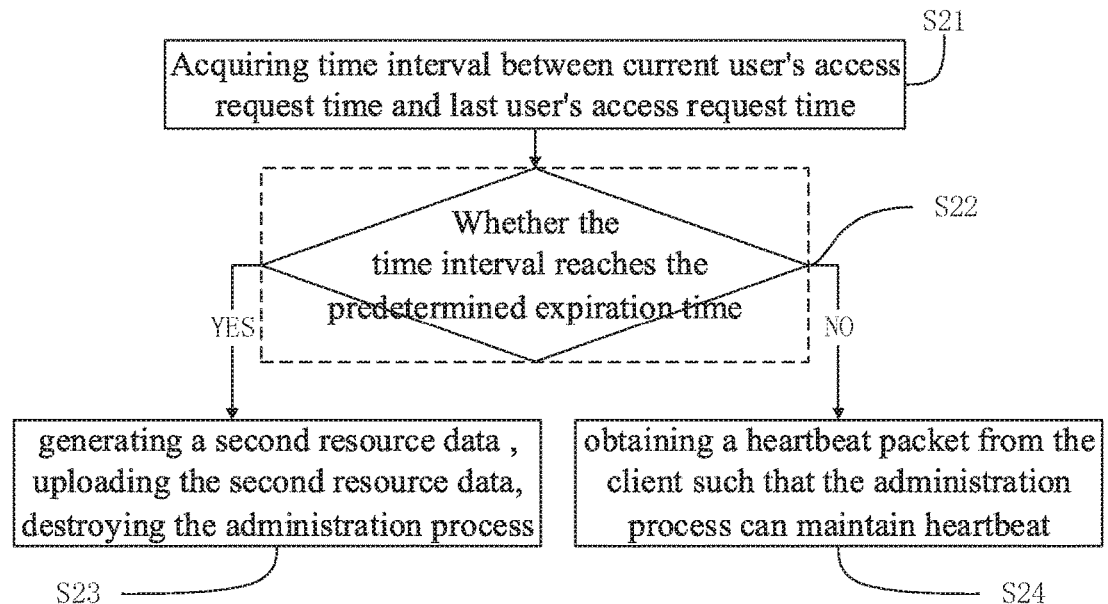
FIG. 2 illustrates a specific flow chart of step 20 in the method for customer resource acquisition according to the first embodiment.

As shown in FIG. 2, in a specific embodiment, the customer acquisition method further includes step S20, the administration process created in the memory may be monitored. The step S20 includes the following steps specifically.

S21, Time interval from the time when the last user's access request is received to present time may be acquired.

Wherein, the "present time" represents present system time of the server. In the present application, the server provides a timer upon creating the administration process in the memory; the timer updates its reading number to zero every time a user's access request is received, such that the reading number of the timer represents the time interval from the time the last user's access request is received to present time.

S22, whether the time interval reaches a predetermined expiration time may be determined.

The predetermined expiration time is systematically predetermined and configured for determining whether the response time is overdue. The predetermined expiration time can be understood to be responded to a time point to determine whether to destroy the administration process created in the memory of the server. The predetermined expiration time can be half an hour or else.

S23, If the time interval reaches the predetermined expiration time, a second resource data based on existing user information in the address space may be generated, the second resource data may be uploaded to the server, and the administration process may be destroyed.

The second resource data includes an incomplete set of user information based on the existing user information, which means the second resource data is an incomplete set of user information associated with a customer. In the present embodiment, the time interval reaching the predetermined expiration time means that the client no longer sends any user's access request to the server within the predetermined expiration time. If the server still keeps the administration process in the memory, the memory may be wasted. Furthermore, the memory may be stuck or blocked if over numbered administration processes exist in the memory, thus affecting server's response time to the client and decreasing customer satisfaction. Therefore, if the time interval reaches the predetermined expiration time, a second resource data based on existing user information in the address space is generated, and then uploaded to the database, such that the all the user information corresponding to the same session identifier (session ID) is uploaded to the database once and for all, which reduces the number of database accesses to some extent, and thus lessens database access burden. Furthermore, after the second resource data is uploaded to the server, the administration process in the memory is destroyed for freeing up memory, thus preventing the memory in the server from being stuck or blocked, shortening the response time of the memory to the user's access request and improving customer satisfaction.

In the present embodiment, where the time interval reaches the predetermined expiration time, the existing user information in the address space corresponding to the administration process is provided as the second resource date which is then uploaded to the server. The incomplete user information in the second resource data may be used to add, delete, and modify user information acquired by other channels so as to acquire more complete user information. Furthermore, the uploading the second resource data to server also uses a load balancing algorithm to determine the corresponding serve, so as to improve the uploading efficiency of the second resource data.

S24, If the time interval does not reach the predetermined expiration time, a heartbeat packet may be obtained from the client such that the administration process can maintain heartbeat.

Specifically, if the time interval does not reach the predetermined expiration time, the client sends a heartbeat to the server every time unit such that the server can acquire the heartbeat from the client, which heartbeat packet helps the administration process in the memory maintain a heartbeat, thus maintaining a long connection between the client and the server. It can be understood that the registration interface of the client sends a heartbeat packet to the sever every time unit (e.g., 10 s), such that the server maintains the heartbeat of the administration process upon receiving the heartbeat packet, which inhibit the administration process from being destroyed.

In the present embodiment, the heartbeat packet may adopt SO_KEEPALIVE of TCP mechanism, and the heartbeat packet is achieved by sending echo packet via logical layer. Specifically, the SO_KEEPALIVE of the TCP mechanism sends an empty packet to the client every time unit, then the client sends a heartbeat packet to the server. If the server receives the heartbeat packet sent by the client within the time unit, the client and the server maintain a long connection; otherwise, if the server fails not receive the heartbeat packet sent by the client within the time unit, the client is deemed as being off line, then, as depicted in step 23, the second resource data is generated based on the existing user information in the address space, the resource data is uploaded to the server and the administration process is destroyed.

It should be understood that the sequence numbers in the steps above do not indicate the execution order which is determined by its function and internal logic, instead of constituting any limitation on the implementation process of the embodiments of the present application.

Second Embodiment

Figure 3:
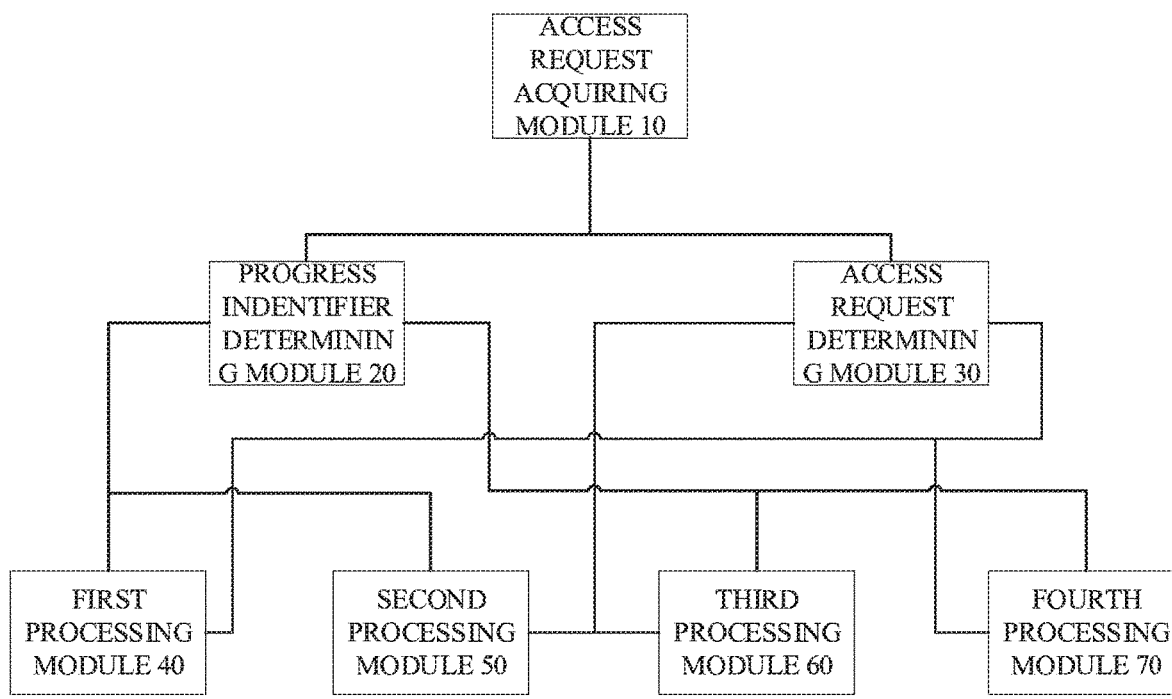
FIG. 3 illustrates a schematic view of a device for customer resource acquisition according to a second embodiment.
Figure 4:
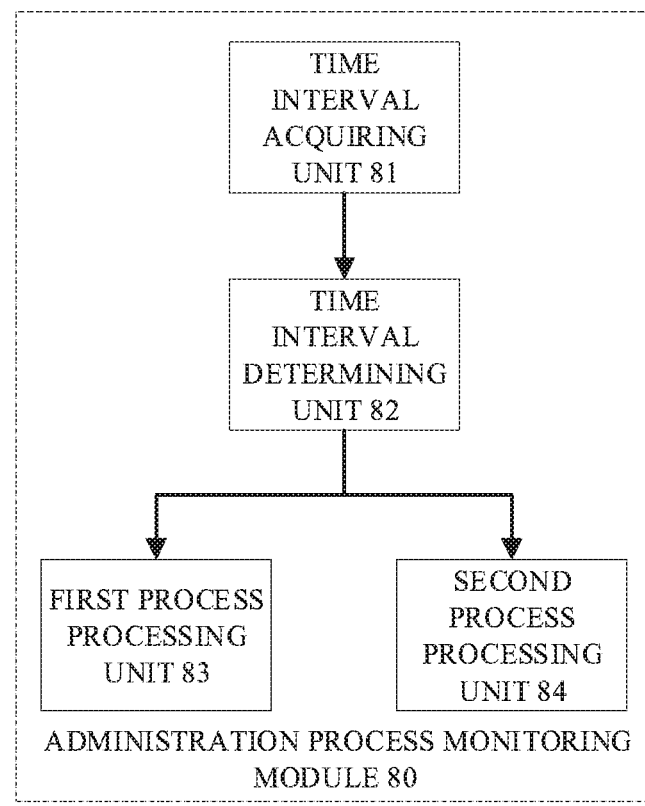
FIG. 4 illustrates a specific schematic view of an administration process monitoring module 80 of the device for customer resource acquisition according to the second embodiment.

FIG. 3 illustrates a device for customer resource acquisition which is in one-to-one correspondence to the method for customer resource acquisition shown in FIG. 1. As illustrated in FIG. 3, the device for customer resource acquisition includes an access request acquiring module 10, a progress identifier determining module 20, an access request determining module 30, a first processing module 40, a second processing module 50, a third processing module 60 and a fourth processing module 70. As illustrated in FIG. 4, the device for customer resource acquisition further includes an administration process monitoring module 80. Functions of the access request acquiring module 10, the progress identifier determining module 20, the access request determining module 30, the first processing module 40, the second processing module 50, the third processing module 60 and the fourth processing module 70 are in one-to-one correspondence to the steps 11-17 in the method for customer resource acquisition as described with reference to the first embodiment; Functions of the administration process monitoring module 80 are in one-to-one correspondence to the step 20 in the method for customer resource acquisition as described with reference to the first embodiment, which would not be described one by one in further details.

The access request acquiring module 10 is configured for acquiring user's access request which includes a session identifier, user information and a progress identifier.

The progress identifier determining module 20 is configured for determining whether the progress identifier is a completed identifier.

The access request determining module 30 is configured for determining whether the user's access request is a first access request corresponding to the session identifier.

The first processing module 40 is configured for determining a corresponding administration process based on the session identifier; storing the user information in an address space corresponding to the administration process; generating a first resource data based on all the user information stored in the address space; uploading the first resource data to the server; and destroying the administration process, if the progress identifier is the completed identifier and the user's access request is not the first access request.

The second processing module 50 is configured for generating a first resource data based on the user information in the user's access request, and uploading the first resource data to the server if the progress identifier is the completed identifier and the user's access request is the first access request.

The third processing module 60 is configured for creating an administration process in the memory, allocating corresponding address space for the administration process and storing the user information in the address space if the progress identifier is not a completed identifier and the user's access request is a first access request.

The fourth processing module 70 is configured for storing the user information in the address space corresponding to the administration process if the progress identifier is not a completed identifier and the user's access request is not a first access request.

The administration process monitoring module 80 is configured for monitoring the administration process created in the memory.

Preferably, the administration process monitoring module 80 includes a time interval acquiring unit 81, a time interval determining unit 82, a first process processing unit 83 and a second process processing unit 84.

The time interval acquiring unit 81 is configured for acquiring time interval from the time when the last user's access request is received to present time.

The time interval determining unit 82 is configured for determining whether the time interval reaches a predetermined expiration time.

The first process processing unit 83 is configured for generating a second resource data based on existing user information in the address space, uploading the second resource data to the server, and destroying the administration process if the time interval reaches the predetermined expiration time.

The second process processing unit 84 is configured for obtaining a heartbeat packet from the client such that the administration process can maintain heartbeat if the time interval does not reach the predetermined expiration time.

Third Embodiment

The present embodiment provides a computer-readable storage medium storing computer-readable instructions. Executed by a processor, the computer-readable instructions may perform the method for customer resource acquisition as described in the first embodiment, which would not be repeated in further details. Alternatively, executed by the processor, the computer-readable instructions may achieve the functions of each of the modules/units in the device for customer resource acquisition as described in the second embodiment, which would not be repeated in further details.

Fourth Embodiment

Figure 5:
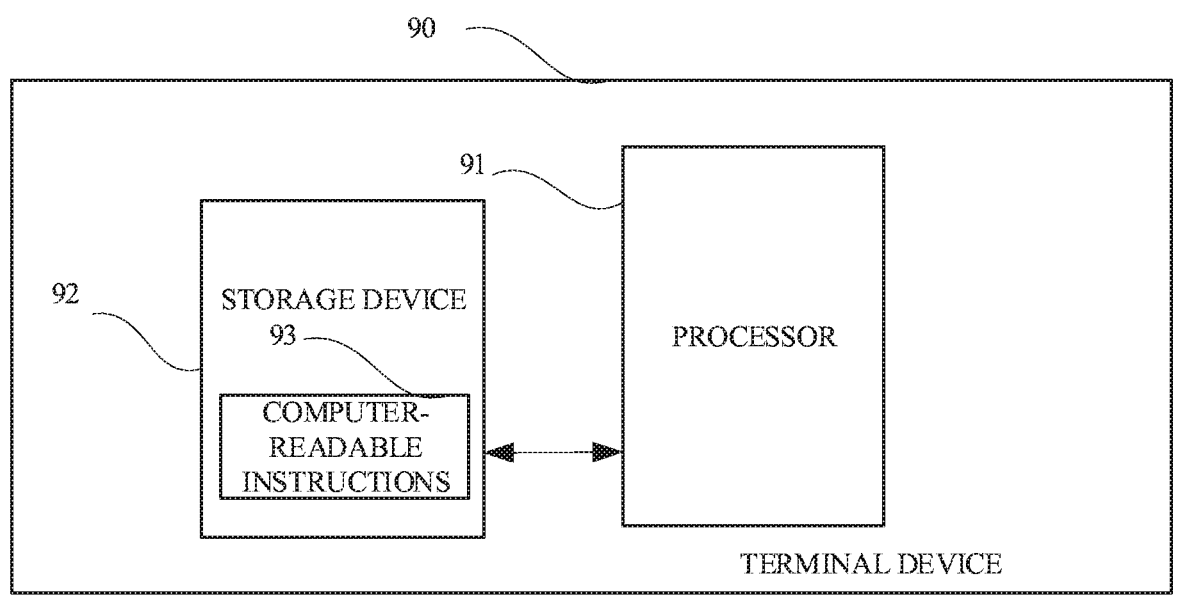
FIG. 5 is a schematic view of a terminal device provided in a fourth embodiment.

FIG. 5 illustrates a schematic view of a terminal device provided by one embodiment of the present application. As illustrated in FIG. 5, the terminal device 90 includes a processor 91, a storage device 92 and computer-readable instructions 93 stored in the storage device 92 and executable by processor 91. The processor 91 may perform the steps of the method for customer resource acquisition as described in the first embodiment, such as steps S11-S17 as illustrated in FIG. 1 or steps S21-S24 as illustrated in FIG. 2, while executing the computer-readable instructions 93. Alternatively, the processor 91 may achieve the functions of each of the modules/units in the device for customer resource acquisition as described in the second embodiment, such as the access request acquiring module 10, the progress identifier determining module 20, the access request determining module 30, the first processing module 40, the second processing module 50, the third processing module 60 and the fourth processing module 70 as illustrated in FIG. 3, or the function of the administration process monitoring module 80 as illustrated in FIG. 4, while executing the computer-readable instructions 93.

For example, the computer-readable instructions 93 may be divided into one or more modules/units stored in the storage device 92 and executed by the processor 91 for achieving the purpose of the present application. The one or more modules/units can be an instruction segment of a series of computer-readable instructions capable of performing a particular function, which is used to depict the execution process of computer-readable instructions 93 in the terminal device 90. For example, the computer-readable instructions 93 may be divided into the access request acquiring module 10, the progress identifier determining module 20, the access request determining module 30, the first processing module 40, the second processing module 50, the third processing module 60 and the fourth processing module 70 as described in the second embodiment (as shown in FIG. 3), or divided into the administration process monitoring module 80 as described in the second embodiment (as shown in FIG. 4). Functions of each of the modules are specifically as follows:

The access request acquiring module 10 is configured for acquiring user's access request which includes a session identifier, user information and a progress identifier.

The progress identifier determining module 20 is configured for determining whether the progress identifier is a completed identifier.

The access request determining module 30 is configured for determining whether the user's access request is a first access request corresponding to the session identifier.

The first processing module 40 is configured for determining a corresponding administration process based on the session identifier; storing the user information in an address space corresponding to the administration process; generating a first resource data based on all the user information stored in the address space; uploading the first resource data to the server; and destroying the administration process if the progress identifier is a completed identifier and the user's access request is not a first access request.

The second processing module 50 is configured for generating a first resource data based on the user information in the user's access request, and uploading the first resource data to the server if the progress identifier is the completed identifier and the user's access request is the first access request.

The third processing module 60 is configured for creating an administration process in the memory, allocating corresponding address space for the administration process and storing the user information in the address space, if the progress identifier is not the completed identifier and the user's access request is the first access request.

The fourth processing module 70 is configured for storing the user information in the address space corresponding to the administration process if the progress identifier is not a completed identifier and the user's access request is not a first access request.

The administration process monitoring module 80 is configured for monitoring the administration process created in the memory.

Preferably, the administration process monitoring module 80 includes a time interval acquiring unit 81, a time interval determining unit 82, a first process processing unit 83 and a second process processing unit 84.

The time interval acquiring unit 81 is configured for acquiring time interval between current user's access request time and last user's access request time.

The time interval determining unit 82 is configured for determining whether the time interval reaches a predetermined expiration time.

The first process processing unit 83 is configured for generating a second resource data based on existing user information in the address space, uploading the second resource data to the server, and destroying the administration process if the time interval reaches the predetermined expiration time.

The second process processing unit 84 is configured for obtaining a heartbeat packet from the client such that the administration process can maintain heartbeat if the time interval does not reach the predetermined expiration time.

The terminal device 90 may be a computing device such as a desktop computer, a notebook, a palmtop computer and a cloud server. The terminal device includes but not limited to the processor 91 and the storage device 92. It is understood by those skilled in the art that the terminal device 90 illustrated in FIG. 5 is merely exemplary instead of constituting limitation thereof, which may include additional components or omit some components than those illustrated, or may combine certain components or different components. For example, the terminal device may further include an input/output device, a network access device, a bus, etc.

The processor 91 may be a central processing unit (CPU) or other general-purpose processors, a digital signal processor (DSP), an application specific integrated circuit (ASIC), a field-programmable gate arrays (FPGAs) or other programmable logic devices, discrete gates or transistor logic devices, discrete hardware components, and the like. The general purpose processor may be a microprocessor or any other conventional processor and the like.

The storage device 92 may be an internal storage unit of the terminal device 90, such as a hard disk or a memory of the terminal device 90. The storage device 92 may also be an external storage device of the terminal device 90, such as a plug-in hard disk, a smart media card (SMC), a Secure Digital (SD) card, and a flash card and the like provided on the terminal device 90. Furthermore, the storage device 92 may also include both an internal storage unit of the terminal device 90 and an external storage device. The storage device 92 is used to store the computer-readable instructions 93 and other programs and data required by the terminal device. The storage device 92 is also configured to temporarily store data that has been or would be output.

It will be apparent to those skilled in the art that the division of each functional unit and module described above is merely exemplified for describing the present application conveniently and briefly. In actual applications, the above functions may be assigned to different functional units and modules as needed. Interior structure of the device may be divided into different units or modules to achieve all the or part of the functions described above. Each of the functional units and modules in the embodiment may be integrated into one processing unit, alternatively, each of the units may exist physically separated, or two or more of the units may be integrated into one unit, and the integrated unit may be implemented in the form of hardware, and may also be implemented in the form of software functional units. Furthermore, the specific names of the functional units and modules are also for convenience of distinguishing from each other instead of intending to limit the scope of the present application. Specific working process of each of the units and the modules in the foregoing system may refer to the corresponding process as described in the foregoing method embodiment, which would not be described herein in further details.

In the above embodiments, descriptive focuses on the various embodiments are different, and the parts that are not detailed or described in a certain embodiment can be referred to the associated descriptions in other embodiments.

Those skilled in the art will appreciate that the elements and algorithm steps of the various examples described in connection with the embodiments disclosed herein can be implemented in electronic hardware or a combination of computer software and electronic hardware. Whether these functions are performed in hardware or software depends on the specific application and design constraints of the technical solution. Those skilled in the art may utilize different methods for implementing the described functions for each particular application, but such implementation should not be deemed as going beyond the scope of the present application.

In the embodiments provided by the present application, it should be understood that the disclosed apparatus/terminal device and method may be implemented in alternative manners. For example, the device/terminal device embodiment described above is merely illustrative. For example, the division of the modules or units is only logical function division. In actual implementation, there may exist different division manners, such as multiple units or components may be combined or integrated into another system, or some features may be omitted or not be implemented. In addition, mutual coupling, direct coupling or communication connection shown or discussed above may be an indirect coupling or communication connection via some interfaces, devices or units, and may be electrical, mechanical connection or the like.

The units described as separate components may or may not be physically separated, and the components displayed as units may or may not be physical units, that is, may be located in one place, or may be distributed to multiple network units. Some or all of the units may be selected according to actual needs to achieve the purpose of the technical solution of the embodiment.

In addition, each functional unit in each embodiment of the present application may be integrated into one processing unit, or each unit may exist physically separated, or two or more of the units may be integrated into one unit. The above integrated unit can be implemented in the form of hardware or a software functional unit.

If implemented in the form of a software functional unit and sold or used as a separate product, the integrated modules/unit may be stored in a computer-readable storage medium. In view of the foregoing, the present application implements all or part of the processes in the foregoing embodiments, and may also be implemented by computer-readable instructions, which may be stored in a computer readable storage medium. The computer readable instructions, when executed by a processor, may implement the steps of the various method embodiments described above. Wherein the computer-readable instructions comprise computer-readable instruction codes, which may be in the form of source codes, object codes, executable file or some intermediate form or the like. The computer-readable medium may include any entity or device capable of carrying the computer readable instruction code, a recording medium, a USB flash drive, a removable hard drive, a magnetic disk, an optical disk, a computer memory, a read only memory (ROM), random access memory (RAM), electrical carrier signals, telecommunications signals, and software distribution media. It should be understood that the contents in the computer-readable medium can be appropriately increased or decreased according to the requirements of legislation and patent practice in the jurisdiction. For example, in some jurisdictions, according to legislation and patent practice, the computer-readable medium does not include electrical carrier signals and telecommunication signals.

The embodiments described above are only for explaining the technical solutions of the present application, and are not limited thereto; although the present application has been described in detail with reference to the foregoing embodiments, those skilled in the art should understand that the technical solutions described in the examples may be modified or equivalently replaced with some of the technical features; and the modifications or replacements do not deviate from the spirit and scope of the technical solutions of the embodiments of the present application, and should fall into the scope of protection of the present application.

What is claimed is:

1. A method for customer resource acquisition, comprising:
   acquiring a user's access request which includes a session identifier, user information and a progress identifier, wherein the progress identifier indicating progress of submitting the user information and further indicating whether a complete set of user information has been submitted completely;
   determining whether the progress identifier is a completed identifier, where the completed identifier indicating that the complete set of user information has been submitted completely corresponding to the session identifier;
   determining whether the user's access request is a first access request corresponding to the session identifier, where the first access request is a first acquired user's access request since a session is established;
   if the progress identifier is a completed identifier and the user's access request is not a first access request, determining a corresponding administration process based on the session identifier; storing the complete set of user information in an address space corresponding to the administration process; generating a first resource data based on the complete set of user information stored in the address space; uploading the first resource data to a server; and destroying the administration process; and
   wherein the first resource data, which is stored in the address space, includes at least one or more user's access requests such that the at least one or more user's access requests included in the first resource data forms the complete set of user information, submitted by the user, in the first resource data; and
   wherein by once receiving the first resource data only, the server acquires, at once, the complete set of user information included in the at least one or more user's access requests, which is further included in the first resource data, thus effectively reducing a number of times the server is accessed, and thus lessening the server access burden; and
   wherein by first storing the complete set of user information in the address space corresponding to the administration process before uploading the first resource data to the server, the method does not need to directly upload the first resource data to the server, thus further lessening the server access burden; and
   wherein by only once storing the complete set of user information in the address space corresponding to the administration process, the method does not need to create and store an administration process corresponding to each user's access request in a memory of the server, thereby saving memory occupation in the server.

2. The method for customer resource acquisition of claim 1, wherein after determining whether the progress identifier is a completed identifier and determining whether the user's access request is a first access request corresponding to the session identifier, the method for customer resource acquisition further includes: if the progress identifier is a completed identifier and the user's access request is a first access request, generating a first resource data based on the user information in the user's access request which is the first access request, and uploading the first resource data to the server.

3. The method for customer resource acquisition of claim 1, wherein after determining whether the progress identifier is a completed identifier and determining whether the user's access request is a first access request corresponding to the session identifier, the method for customer resource acquisition further includes: if the progress identifier is not a completed identifier and the user's access request is a first access request, creating an administration process in the memory, allocating corresponding address space for the created administration process and storing the user information in the address space for the created administration process.

4. The method for customer resource acquisition of claim 1, wherein after determining whether the progress identifier is a completed identifier and determining whether the user's access request is a first access request corresponding to the session identifier, the method for customer resource acquisition further includes: if the progress identifier is not a completed identifier and the user's access request is not a first access request, storing the user information in an address space corresponding to the administration process.

5. The method for customer resource acquisition of claim 1, further comprising: monitoring the administration process created in the memory including:
   acquiring a time interval between a current user's access request time and a last user's access request time;
   determining whether the time interval reaches a predetermined expiration time;
   if the time interval reaches the predetermined expiration time, generating a second resource data based on existing user information in the address space, uploading the second resource data to the server, and destroying the administration process.

6. The method for customer resource acquisition of claim 5, further comprising: if the time interval does not reach the predetermined expiration time, obtaining a heartbeat packet from a client such that the administration process maintains the heartbeat packet, and wherein the client is related to the user's access request.

7. A terminal device, comprising a storage device, a processor and computer-readable instructions stored in the storage device and executable on the processor, wherein the processor executes the computer-readable instructions to perform the following steps:

acquiring a user's access request which includes a session identifier, user information and a progress identifier, wherein the progress identifier indicating progress of submitting the user information and further indicating whether a complete set of user information has been submitted completely;

determining whether the progress identifier is a completed identifier, where the completed identifier indicating that the complete set of user information has been submitted completely corresponding to the session identifier;

determining whether the user's access request is a first access request corresponding to the session identifier, where the first access request is a first acquired user's access request since a session is established;

if the progress identifier is a completed identifier and the user's access request is not a first access request, determining a corresponding administration process based on the session identifier; storing the complete set of user information in an address space corresponding to the administration process; generating a first resource data based on the complete set of user information stored in the address space; uploading the first resource data to a server; and destroying the administration process; and wherein the first resource data, which is stored in the address space, includes at least one or more user's access requests such that the at least one or more user's access requests included in the first resource data forms the complete set of user information in the first resource data; and wherein by once receiving the first resource data only, the server acquires, at once, the complete set of user information included in the at least one or more user's access requests, which is further included in the first resource data, thus effectively reducing a number of times the server is accessed, and thus lessening the server access burden; and wherein by first storing the complete set of user information in the address space corresponding to the administration process before uploading the first resource data to the server, the method does not need to directly upload the first resource data to the server, thus further lessening the server access burden; and wherein by only once storing the complete set of user information in the address space corresponding to the administration process, the method does not need to create and store an administration process corresponding to each user's access request in a memory of the server, thereby saving memory occupation in the server.

8. The terminal device of claim 7, wherein after determining whether the progress identifier is a completed identifier and determining whether the user's access request is a first access request corresponding to the session identifier, the processor executes the computer-readable instructions to perform the steps of: if the progress identifier is a completed identifier and the user's access request is a first access request, generating a first resource data based on the user information in the user's access request which is the first access request, and uploading the first resource data to the server.

9. The terminal device of claim 7, wherein after determining whether the progress identifier is a completed identifier and determining whether the user's access request is a first access request corresponding to the session identifier, the processor executes the computer-readable instructions to perform the steps of: if the progress identifier is not a completed identifier and the user's access request is a first access request, creating an administration process in the memory, allocating a corresponding address space for the created administration process and storing the user information in the address space for the created administration process.

10. The terminal device of claim 7, wherein after determining whether the progress identifier is a completed identifier and determining whether the user's access request is a first access request corresponding to the session identifier, the processor executes the computer-readable instructions to perform the step of: if the progress identifier is not a completed identifier and the user's access request is not a first access request, storing the user information in the address space corresponding to the administration process.

11. The terminal device of claim 7, wherein the processor executes the computer-readable instructions to perform the step of: monitoring the administration process created in the memory including:

acquiring a time interval between a current user's access request time and a last user's access request time;

determining whether the time interval reaches a predetermined expiration time;

if the time interval reaches the predetermined expiration time, generating a second resource data based on existing user information in the address space, uploading the second resource data to the server, and destroying the administration process.

12. The terminal device of claim 11, wherein the processor executes the computer-readable instructions to perform the step of: if the time interval does not reach the predetermined expiration time, obtaining a heartbeat packet from a client such that the administration process maintains the heartbeat packet, and wherein the client is related to the user's access request.

13. A computer-readable storage medium, comprising computer-readable instructions, wherein the computer-readable instructions are executed by a processor to perform the following steps:

acquiring a user's access request which includes a session identifier, user information and a progress identifier, wherein the progress identifier indicating progress of submitting the user information and further indicating whether a complete set of user information has been submitted completely;

determining whether the progress identifier is a completed identifier, where the completed identifier indicating that the complete set of user information has been submitted completely corresponding to the session identifier;

determining whether the user's access request is a first access request corresponding to the session identifier, where the first access request is a first acquired user's access request since a session is established;

if the progress identifier is a completed identifier and the user's access request is not a first access request, determining a corresponding administration process based on the session identifier; storing the complete set of user information in an address space corresponding to the administration process; generating a first resource data based on the complete set of user information stored in the address space; uploading the first resource data to a server; and destroying the administration process; and
- wherein the first resource data, which is stored in the address space, includes at least one or more user's access requests such that the at least one or more user's access requests included in the first resource data forms the complete set of user information in the first resource data; and
- wherein by once receiving the first resource data only, the server acquires, at once, the complete set of user information included in the at least one or more user's access requests, which is further included in the first resource data, thus effectively reducing a number of times the server is accessed, and thus lessening the server access burden; and
- wherein by first storing the complete set of user information in the address space corresponding to the administration process before uploading the first resource data to the server, the method does not need to directly upload the first resource data to the server, thus further lessening the server access burden; and
- wherein by only once storing the complete set of user information in the address space corresponding to the administration process, the method does not need to create and store an administration process corresponding to each user's access request in a memory of the server, thereby saving memory occupation in the server.

14. The computer-readable storage medium of claim 13, wherein after determining whether the progress identifier is a completed identifier and determining whether the user's access request is a first access request corresponding to the session identifier, the computer-readable instructions are executed by the processor to perform the steps of: if the progress identifier is a completed identifier and the user's access request is a first access request, generating a first resource data based on the user information in the user's access request which is the first access request, and uploading the first resource data to a server.

15. The computer-readable storage medium of claim 13, wherein after determining whether the progress identifier is a completed identifier and determining whether the user's access request is a first access request corresponding to the session identifier, the computer-readable instructions are executed by the processor to perform the steps of: if the progress identifier is not a completed identifier and the user's access request is a first access request, creating an administration process in the memory, allocating a corresponding address space for the created administration process and storing the user information in the address space for the created administration process.

16. The computer-readable storage medium of claim 13, wherein after determining whether the progress identifier is a completed identifier and determining whether the user's access request is a first access request corresponding to the session identifier, the computer-readable instructions are executed by the processor:
- if the progress identifier is not a completed identifier and the user's access request is not a first access request, storing the user information in the address space corresponding to the administration process.

17. The computer-readable storage medium of claim 13, wherein the computer-readable instructions are executed by the processor to perform the step of:
- monitoring the administration process created in the memory including:
- acquiring a time interval between a current user's access request time and a last user's access request time;
- determining whether the time interval reaches a predetermined expiration time;
- if the time interval reaches the predetermined expiration time, generating a second resource data based on existing user information in the address space, uploading the second resource data to the server, and destroying the administration process.

18. The computer-readable storage medium of claim 17, wherein the computer-readable instructions are executed by the processor to perform the step of:
- if the time interval does not reach the predetermined expiration time, obtaining a heartbeat packet from a client such that the administration process maintain the heartbeat packet, and wherein the client is related to the user's access request.

* * * * *